Patented Nov. 27, 1951

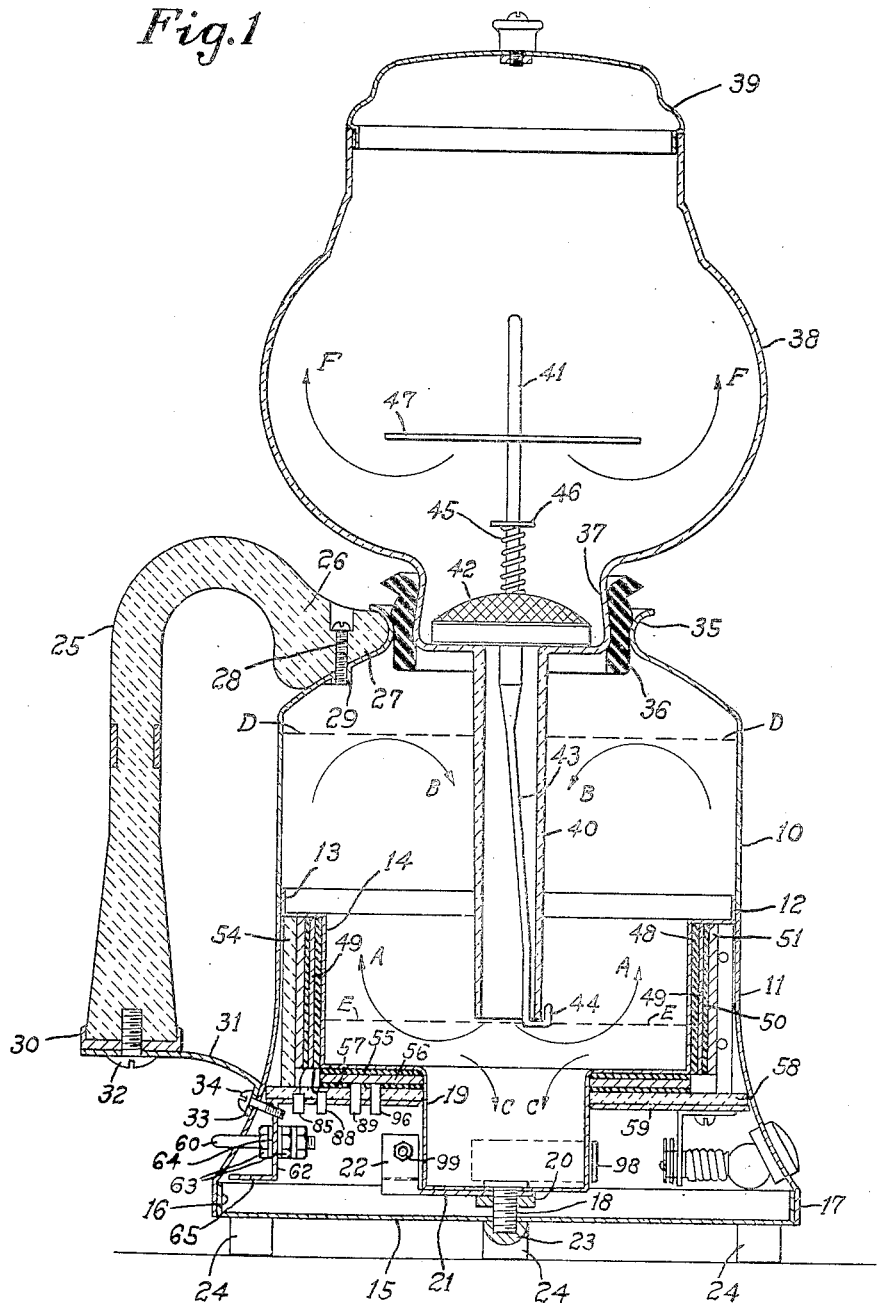

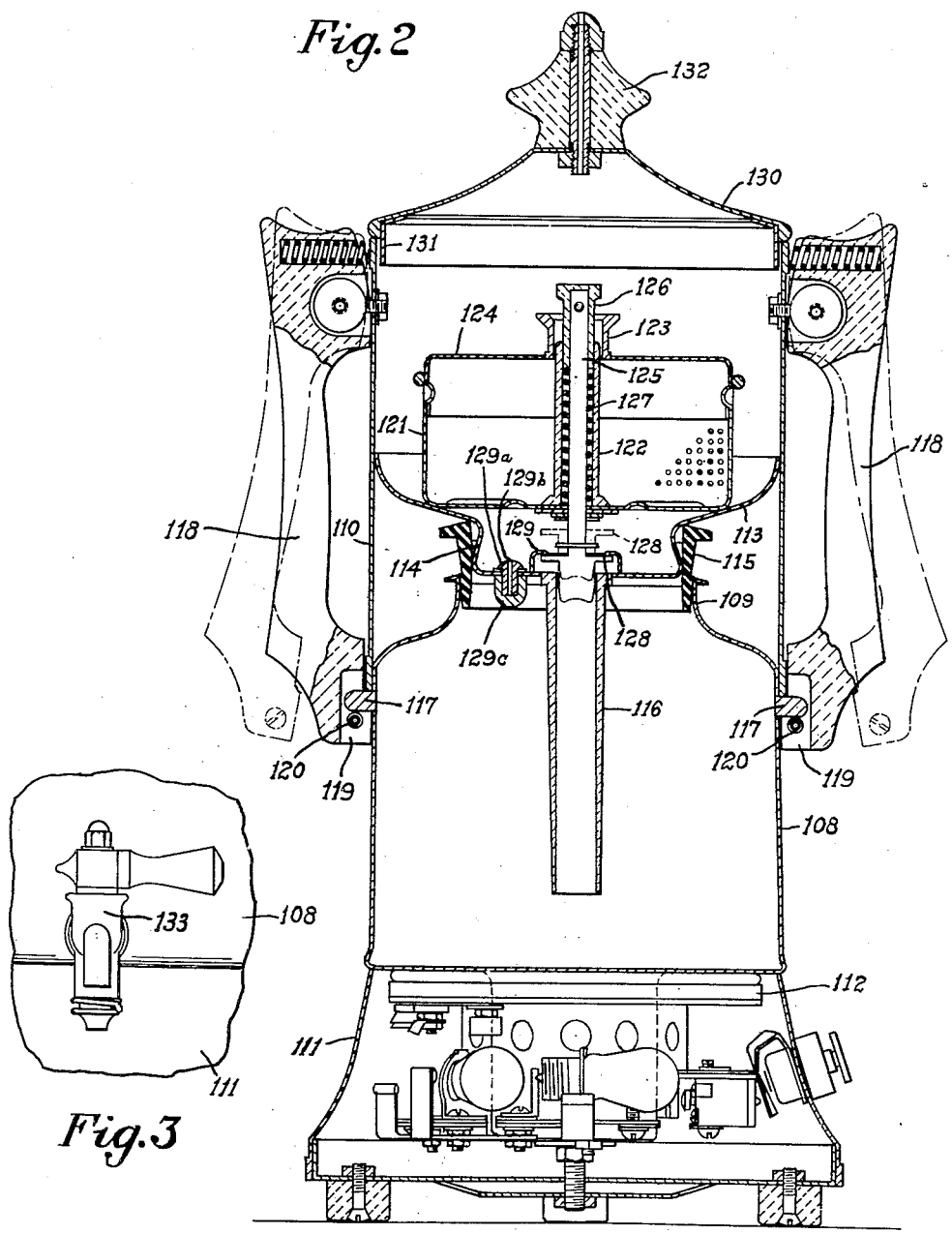

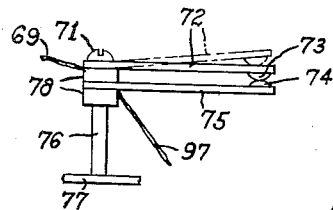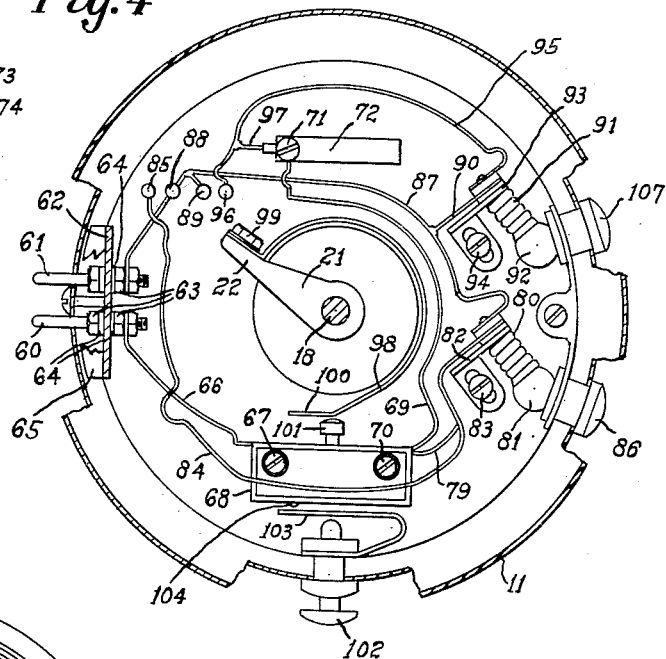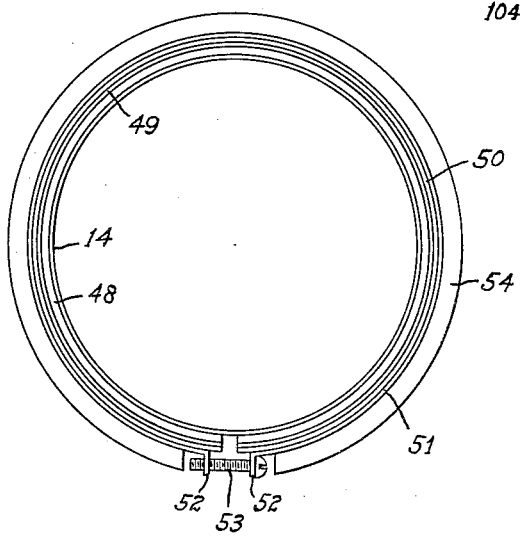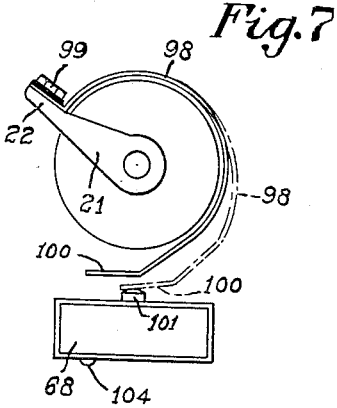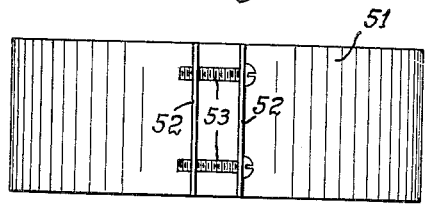

2,576,432

UNITED STATES PATENT OFFICE 2,576,432

VACUUM COFFEE MAKER

Albert C. Wilcox, Chicago, Ill.

Application May 1, 1946, Serial No. 666,371

9 Claims. (Cl. 99—281)

1

The invention relates to vacuum coffee makers and has for its object to generally improve and simplify the construction and operation of such devices.

One object of the invention is to provide a vacuum coffee maker which is so constructed that all of the ground coffee will be submitted to the action of brewing throughout the entire time that the hot water is in the upper chamber of the coffee maker.

Another object is to provide a novel construction of electric heating means having a high heat unit and a low heat unit with means for automatically breaking the circuit to the high heat unit at a pre-determined time and for automatically closing the circuit to the low heat unit when the temperature of the coffee has been lowered to a pre-determined degree.

Still another object is to provide red and green indicating lights in the circuits of the high heat unit and the low heat unit respectively.

A further object is to provide a device of this character in which means is provided for automatically breaking the circuit to the heating unit before damage has occurred to the device, in the event the high heat unit should be turned on when there is no water in the coffee maker.

The above objects together with others which will be apparent from the drawings and following description, or which may be later referred to, may be attained by constructing the improved coffee maker in the manner illustrated in the accompanying drawings, in which:

Fig. 1 is a vertical, longitudinal sectional view through a vacuum coffee maker embodying the invention;

Fig. 2 a vertical, longitudinal sectional view through a slightly modified form of vacuum coffee maker embodying the invention;

Fig. 3 a fragmentary elevation of a portion of the exterior of the vacuum coffee maker shown in Fig. 2, showing the attachment of a faucet or spigot thereto;

Fig. 4 a bottom plan sectional view through the electric control circuit in the lower portion of the coffee maker;

Fig. 5 a detached plan view of the high heat unit assembly;

Fig. 6 a side elevation of the assembly shown in Fig. 5;

Fig. 7 a detached plan view of the micro switch and curved bi-metal strip which operates the same, showing the two positions of the bi-metal strip, and Fig. 8 a detached elevation of an auxiliary bi-metal switch.

2

Referring first to the construction shown in Fig. 1, the lower member of the device may be formed of sheet metal or the like and preferably comprises the upper shell 10 and the lower shell 11, the opposed edges of which are butted together as indicated at 12 and connected to the offset annular flange 13 at the upper end of the inner shell 14.

While the upper and lower shells 10 and 11 may be formed in one integral member, they are preferably made as shown in order to facilitate manufacturing operations.

The bottom plate 15 is provided with an upturned annular flange 16 which fits within the cylindrical terminal flange 17 of the lower shell 11. A stud 18 is located through and rigidly attached to the bottom wall of the cup or well 19, formed at the bottom of the inner shell 14, and a lock nut 20 is located upon the stud and clamps the arm 21 of the bi-metal support 22 against the bottom of said cup.

The stud 18 is located through a central aperture in the bottom plate 15 and a binding nut 23 is provided upon the end of the stud for attaching the bottom plate in position. Feet or legs 24 of any suitable material may be fixed upon the under side of the bottom plate for supporting the coffee maker in spaced position upon a table or the like.

A handle 25, of Bakelite or the like, provided with the inwardly curved upper end portion 26 shaped to fit upon the conical top 27 of the upper shell 10, may be connected thereto as by the machine screw 28 located through this portion of the handle and through the internal angular portion 29 formed upon the shell 10.

A metal cap 30 may be located upon the lower end of the Bakelite handle 25, which rests upon and is connected to the metal supporting bracket 31 by means of the screw 32, the bracket 31 having the angular flange 33 which is connected to the lower shell 11 as by the screw 34.

The upper open end of the upper shell 10 terminates in the arcuate annular flange 35. A rubber ring seal 36 is located within this upper open end of the upper shell 10 to receive the reduced flared lower portion 37 of the upper water container 38 which may be of the general shape shown in Fig. 1 and may be formed of glass, metal or other suitable material.

Any suitable design of removable cover or lid 39, arranged to fit tightly upon the open upper end of the water container 38, may be provided. A siphon tube 40 is formed upon the lower end of the upper water container 38 and extends downward into the inner shell 14.

A rod 41 has a wire mesh or other suitable strainer 42 slidably mounted thereon, the rod being provided with the depending angular extension 43 having the hook 44 at its lower end for engaging over the lower end of the siphon tube 40.

A compression spring 45 is located around the rod 41 between the strainer 42 and the fixed collar 46 upon the rod, and a baffle plate or disc 47 is fixed upon the rod above said collar.

For a description of the electric circuit and heating means housed within the lower shell 11, reference is also made to Figs. 4 to 8 inclusive. First describing the high heat and low heat electric heating units, attention is called especially to Figs. 1, 5 and 6.

A mica insulating sheet 48 is located around the outside of the inner shell 14, and the high heat electric unit 49 in the form of a ribbon annulus is located around said mica sheet. A second mica insulating sheet 50 is located around the outside of the high heat electric unit and a metal binding plate 51, having annular flanges 52 at its opposed ends, is located around the mica insulating sheet 50 and provided with clamping screws 53 for tightly drawing up the heating unit assembly upon the inner shell 14.

An asbestos insulating sheet 54 is located around the metal binding plate 51 for baffling heat from the unit to the outside shell 11.

A mica insulating sheet or ring disc 55 is located against the bottom of the inner shell 14, surrounding the cup or well portion 19 thereof, and the low heat unit 56 is located beneath this mica sheet and insulated by a second mica sheet 57 upon the under side of the low heat unit.

An asbestos insulating disc 58 is located beneath the mica disc 57 and supported upon the metal disc or chassis 59. The chassis 59 is held against movement by means of the screw 34 which is located through the lower shell 11 and into the chassis so that it can not move either to the left or to the right preventing throwing of any of the mechanical operative parts out of line.

The terminal points 60 and 61 for connection to the ordinary connector plug are attached to and insulated from the depending flange 62 of the chassis in usual and ordinary manner as by the nuts 63 and insulation washers 64.

An extension baffle 65, in the form of an outturned flange, may be formed upon the lower end of the depending flange 62 of the chassis. A wire 66 leads from the terminal 60 to the binding screw 67 of the micro switch 68 and a wire 69 leads from the binding post 70 of the micro switch to the binding screw 71 of the bi-metal strip 72 which is provided with a contact point 73 normally engaged with the contact point 74 of the rigid stationary metal strip 75.

The micro switch 68 is a single pole, double throw switch having a spring blade adapted for reverse-action, cross-center movement by alternate operation of the push buttons 101 and 104. This switch is of the general type of U. S. Patent No. 1,960,020.

Both the bi-metal strip 72 and the rigid metal strip 75 are mounted upon the aluminum stud 76 provided with a flange 77 at its lower end for attachment to the bottom of the coffee maker and are insulated from each other and from the metal strip by means of the insulators 78.

A wire 79 leads from the binding screw 70 of the micro switch to the socket 80 for the light bulb 81. This socket is carried upon a metal bracket support 82 which is mounted in the bottom of the shell by means of a binding screw 83. A wire 84 is connected to the wire 79 and leads to one terminal 85 connected to the high heat unit 49.

A red transparent jewel or lens 86 is mounted in the lower shell 11 in such position that the light from the bulb 81 will shine therethrough. A wire 87 leads from the socket 80 of the light bulb 81 to the other terminal 88 of the high heat unit 49 and connects to the plug in point or terminal 61.

The wire 87 is also connected to one terminal 89 of the low heat unit 56 and is also connected by a short wire 90 with the socket 91 of the light bulb 92, said socket being mounted upon a support bracket 93 which is attached within the lower portion of the coffee maker by a binding screw 94. Another wire 95 leads from the socket 91 to the other terminal 96 of the low heat unit 58 and is also connected as at 97 to the rigid strip 75 of the auxiliary switch.

A curved bi-metal strip 98 is fixed at one end to the support 22 as by the binding nut 99 and is located partially around the cup or well portion 19 in the bottom of the inner shell 14, having the angular free end 100 normally spaced from the low heat trip button 101 of the micro switch 68 as shown in Fig. 4 and in full lines in Fig. 7.

A push button 102 is slidably mounted through the shell 11 and has a spring finger 103 fixed thereon adapted to contact the high heat unit trip button 104 of the micro switch.

A transparent green jewel or lens 107 is fixed in the lower shell in such position that the light from the bulb 92 will shine therethrough.

In the operation of the improved vacuum coffee maker, water is placed in the lower water container formed by the upper shell 10 and the inner shell 14, the water level for six cups being indicated by the dot and dash line D—D.

Next the rod 41 carrying the baffle 47, strainer 42 and fastening hook 44 is placed in the upper container 38, the lower portion 43 thereof being inserted through the tube 40 and the hook 44 thereon hooked over the lower end of the tube.

Then the water container 38, carrying the rubber seal ring 36, is placed tightly in the neck 35 of the lower container. The required amount of ground coffee for making six cups, if the water level in the lower container is at D, is then placed in the upper container 38 and a plug cord set is plugged into the terminals 60 and 61 and into a wall socket or base receptacle.

Then the momentary thumb button 102 is pressed inward, the spring finger 103 thereof operating the high heat unit button 104 of the micro switch 68 and then current passes from the terminals 60 and 61 through the wiring as shown in Fig. 4, to the high heat unit 49 and lights the bulb 81 so that the light thereof shines through the red jewel 86.

The high heat unit 49 starts to heat up and as the heat rises and is radiated to the water through the shell 14, the water circulates as shown by the arrows A—A and B—B in Fig. 1, the heated water rising as indicated by the arrows A while the cold water from above circulates downward as indicated by the arrows B.

This circulating cycle continues up to and including the boiling point but very little heat is communicated below the bottom of the shell 14 to the small cup or well 19 located in the center of the bottom of the pot.

For a certain period of time as the water rises in temperature pressure is created on top of the water surface D—D and finally a gradual rise of water starts up the tube 40, the water mingling with the coffee and brewing. As the water level lowers from D the boiling action becomes faster and more violent, this violent action causing a rapid succession of pressure escaping through the tube 40 which when immerging from the top level of the water in the upper container causes agitation or splashing above the water level therein.

The baffle 47 deflects this action to the sides of the upper container in the direction of the arrows F in Fig. 1. When the water is at the boiling point and in full agitation, it radiates heat down into the well 19 as indicated by the arrows C.

During the preliminary heating period of the water, the curved bi-metal strip 98 is inactive and lays close to the exterior of the well 19, as shown in Fig. 4, and in full lines in Fig. 7.

As the water level in the lower container lowers and the boiling action increases, the heat is radiated down into the well 19 and as the water level is lowered to the dotted line E—E, the boiling action is very active and the bi-metal strip 98 becomes active and moves to the dotted line position shown in Fig. 7 snapping the low heat button 101 of the micro switch 68, which is the position for keeping the coffee warm over an extended period of time.

When the bi-metal strip 98 assumes the broken line position shown in Fig. 7, it operates the micro switch as above described, the circuit to the red light bulb 91 and to the high heat terminals 85 and 88 is broken and the circuit is completed to the green light bulb 92 and to the low heat unit terminals 89 and 96.

The bi-metal device shown in Fig. 8 is however located in the low heat unit circuit. The reason for this is because when the coffee is first brewed to or above the temperature maintained for serving and is kept too hot, the coffee loses a considerable amount of its flavor and taste which passes off in the form of vapor.

The flange 77 of the stud 75 which extends through the insulated disc 58 and chassis 59, and the device shown in Fig. 8 acts as an auxiliary switch and operates as follows.

When the pot is cold or low in temperature the bi-metal strip 72 is in the closed position shown in full lines in Fig. 8. When brewing of the coffee is started and the bottom of the shell 14 becomes heated, the heat travels down the aluminum rod 76 and is transmitted to the bi-metal strip 72 and it becomes active and moves to the open position shown in dotted lines in Fig. 8 before the brewing is finished, thus making an open circuit.

Thus at the time the micro switch 68 is operated by the bi-metal strip 98 depressing the low heat button 101, the circuit to the low heat unit continues to remain open until the temperature of the coffee lowers.

The cooling effect travels down the rod 76 to the bi-metal strip 72 cooling the same and permitting it to move back to the closed position shown in full lines in Fig. 8. The current then flows through the green light 92 and the low heat unit 56.

As the temperature rises the bi-metal strip 72 again becomes active and breaks the circuit.

This cycle or operation continues as long as coffee is in the lower water container. If the high heat unit should by any change be turned on without any water in the lower container, the heat will rapidly travel through the shell to the bi-metal strip 98 and operate the same to trip the button 101 of the micro switch.

The heat will also have operated the bi-metal strip 72 breaking the circuit to the low heat unit. As the pot cools down sufficiently to cause the bi-metal strip 72 to return to the full line position, the low heat unit will again be operated but the wattage is so low that the continuous functioning of the low heat unit will not damage the construction of the pot in any way.

In Figs. 2 and 3 is shown a slightly modified form of the improved vacuum coffee maker adapted to an urn type of pot which comprises the cylindrical lower shell 108 having the restricted neck 109 and the cylindrical upper shell 110 which fits upon the upper portion of the lower shell.

The lower shell 108 is mounted upon the base compartment 111 which may house the electrical circuit and cooperating devices which may be the same as above described and illustrated in Figs. 1 and 4 to 8 inclusive, with the exception that the high heat unit as well as the low heat unit may be a flat disc unit as indicated generally at 112.

A bottom member 113 is sweated or otherwise connected to the side walls of the upper shell 110 and provided with the reduced lower portion 114 adapted to fit tightly into the rubber ring seal 115 which is fitted into the reduced neck 109 at the upper end of the lower container 108.

A depending tube 116 is fixed to the bottom of the restricted portion 114 of the member 113 and extends down into the lower container 108. The upper shell 110 fits over the upper end of the lower shell 108 and against the stud 117 thereon and is provided with the spring loaded pivoted handles 118, at opposite sides and having the recesses 119 at their lower ends within which are located the studs 120 for engaging under the studs 117 and holding the parts in assembled position.

A coffee basket 121, formed of sheet metal or the like and perforated as shown, is adapted to be mounted upon the bottom member 113 of the upper container and has a tube 122 fixed to its bottom wall and extending upwardly into the tubular guide 123 of the cover or top portion 124 of the coffee basket.

A vertically movable rod 125 is slidably mounted within the tube 122 and provided at its upper end with a thumb grip 126, a coiled compression spring 127 being located around the rod 125 within the tube 122 between the bottom of the coffee basket 121 and the thumb grip 126.

A pair of fins 128 are fixed upon the lower end of the rod 125 and adapted to engage in a bayonet or twist lock 129 upon the bottom of the member 113.

A suitable cover 130 is provided for the upper container having a depending flange 131 to be received within the open upper end of the said container and a knob 132 by means of which the cover may be removed or replaced.

A faucet or spigot 133 of any usual and well known design may be provided in the lower portion of the lower cotnainer 108 for dispensing the brewed coffee therefrom.

In the operation of this form of the invention, the proper amount of ground coffee is placed in the coffee basket 121 and the cover 124 is placed thereon. A filter cloth or paper is optional and may be placed between the bottom of the coffee basket and the bottom member 113 of the upper container to make a tight seal.

The basket is then placed in the upper container, resting upon the lower member 113 thereof and the thumb grip 126 is pressed down moving the bayonet lock fins 128 from the broken line position to the full line position in Fig. 2 the thumb grip then being given a slight twist to engage the fins 128 in the bayonet lock 129 locking the basket in the position shown in Fig. 2.

The proper amount of water has of course been placed in the lower container 108. As the water heats it rises through the tube 116 flowing up through the coffee in the basket 121 until the full amount has risen to the upper container. As there is an action period at the final rise of water for a certain period of time it circulates the water through the holes in the basket 121 and through the coffee therein, the coffee being submerged.

This differs from the action of the usual vacuum coffee maker wherein when the hot water rises in the upper container the coffee rises on the top of the water and only a portion of it is submitted to the action of brewing.

By the present method the coffee is completely saturated and is exposed to one hundred per cent brewing during the entire time that the water is in the upper container. By this method the water is also pulled down through the coffee, this being an added automatic natural extraction feature.

As shown in Fig. 2 a machine screw 129a, having a bleeder port 129b therein, may be located through the bottom wall of the bottom member 113. By using an ordinary binding nut upon this machine screw the bleeder port would remain open into the lower container which would allow a certain amount of steam pressure to escape from the lower container. This would require a higher pressure to force the water up into the upper container due to the fact that the bleeder port release would have to be overcome and an amount of pressure created above this pressure in order to force the water to the top of the upper container.

By this retarded rise of water, the water could be brought to a higher temperature before it rises up to the top for the brewing of the coffee. As shown in Fig. 1 the bleeder port is closed by placing a blank nut 129c upon the machine screw 129a.

It is pointed out that the water temperature determines when the high heat unit is tripped off, the tripping being dependent upon the heat of the water rather than the heat of the unit. An important factor is that the device will never operate to shut off the high heat unit until the water is at the temperature for which the unit is set at the factory, as the heat of the water determines when the bi-metal shall operate so that the coffee can only be brewed when the water is at the proper temperature for which the device is set.

Under present practice other types of vacuum coffee makers radiate heat from the heat unit for the trip off but in the instant device if the water never reaches the proper temperature it will never trip off.

If by any chance the device should be turned off making the high heat unit active, when there is no water in the lower container, the heat so generated would radiate through the shell very fast and down through the water well which carries the bi-metal, and the bi-metal would trip the switch to the lower heat unit which would not be injurious to the device.

I claim:

1. A vacuum coffee maker comprising a lower container having an open upper end, an upper container having a reduced lower portion received in the open upper end of the lower container, means sealing the connection between the upper and lower containers, a depending tube upon the upper container extending into the lower container, a perforate member at the point of communication between the upper and lower containers, a high heat unit and a low heat unit associated with the lower container, a normally open circuit in which said heat units are located, means for manually closing the circuit to the high heat unit, thermo-responsive means thermally remote from the high heat unit for breaking the circuit to the high heat unit and closing the circuit to the low heat unit when the temperature of the lower container rises to a predetermined point and thermo-responsive means for delaying closing of the circuit to the low heat unit until the temperature of the lower container drops to a predetermined point.

2. A vacuum coffee maker comprising a lower container having an open upper end, an upper container having a reduced lower portion received in the open upper end of the lower container, means sealing the connection between the upper and lower containers, a depending tube upon the upper container extending into the lower container, a perforate member at the point of communication between the upper and lower containers, a high heat unit and a low heat unit associated with the lower container, a red light and a green light associated with the high heat unit and the low heat unit respectively, a normally open circuit in which the heat units and lights are located, means for manually closing the circuit to the high heat unit and the red light, thermo-responsive means thermally remote from the high heat unit for breaking the circuit to the high heat unit and the red light and closing the circuit to the low heat unit and green light when the temperature of the lower container rises to a predetermined point and thermo-responsive means for delaying closing of the circuit to the low heat unit and the green light until the temperature of the lower container drops to a predetermined point.

3. A vacuum coffee maker comprising a lower container having an open upper end, an upper container having a reduced lower portion received in the open upper end of the lower container, means sealing the connection between the upper and lower containers, a depending tube upon the upper container extending into the lower container, a high heat unit and a low heat unit associated with the lower container, a normally open circuit in which said heat units are located, means for manually closing the circuit to the high heat unit, thermo-responsive means thermally remote from the high heat unit for breaking the circuit to the high heat unit and closing the circuit to the low heat unit when the temperature of the lower container rises to a predetermined point and thermo-responsive means for delaying closing of the circuit to the low heat unit until the temperature of the lower container drops to a predetermined point.

4. A vacuum coffee maker comprising a lower container having an open upper end, an upper container having a reduced lower portion received in the open upper end of the lower container, means sealing the connection between the upper and lower containers, a depending tube upon the upper container extending into the lower container, a high heat unit and a low heat unit associated with the lower container, a red light and a green light associated with the high heat unit and the low heat unit respectively, a normally open circuit in which the heat units and lights are located, means for manually closing the circuit to the high heat unit and the red light, thermo-responsive means thermally remote from the high heat unit for breaking the circuit to the high heat unit and the red light and closing the circuit to the low heat unit and the green light when the temperature of the lower container rises to a predtermined point and thermo-responsive means for delaying closing of the circuit to the low heat unit and the green light until the temperature of the lower container drops to a predetermined point.

5. A vacuum coffee maker comprising a lower container having an open upper end, an upper container having a reduced lower portion received in the open upper end of the lower container, means sealing the connection between the upper and lower containers, a depending tube upon the upper container extending into the lower container, a perforate member at the point of communication between the upper and lower containers, a high heat unit and a low heat unit associated with the lower container, a normally open circuit in which said heat units are located, a microswitch located in the circuit and provided with a high heat button and a low heat button, manual means for operating the high heat button of the microswitch for closing the circuit to the high heat unit, thermo-responsive means for operating the low heat button of the microswitch when the temperature of the lower container rises to a predetermined point for opening the circuit to the high heat unit and placing the circuit to the low heat unit in condition for operation and thermo-responsive means for closing the circuit to the low heat unit when the temperature of the lower container drops to a predetermined point and for opening the circuit to the low heat unit when the temperature of the lower container rises to a predetermined point.

6. A vacuum coffee maker comprising a lower container having an open upper end and a reduced well at its lower end, an upper container having its lower portion received into the open upper end of the lower container and having a depending tube extending into the lower container, a high heat unit and a low heat unit associated with the lower container, a normally open circuit in which said heat units are located, a micro switch located in the circuit and having a high heat button and a low heat button, manual means for operating the high heat button to close the circuit to the high heat unit and a curved bi-metal bar surrounding said well for operating the low heat button when the temperature of the lower container rises to a predetermined point.

7. A vacuum coffee maker comprising a lower container having an open upper end and a reduced well at its lower end, an upper container having its lower portion received into the open upper end of the lower container and having a depending tube extending into the lower container, a high heat unit and a low heat unit associated with the lower container, a normally open circuit in which said heat units are located, a micro switch located in the circuit and having a high heat button and a low heat button, manual means for operating the high heat button to close the circuit to the high heat unit and a curved bi-metal bar surrounding said well for operating the low heat button when the temperature of the lower container rises to a predetermined point, and thermo responsive means for closing the circuit to the low heat unit when the temperature of the lower container drops to a predetermined point.

8. A coffee maker having a lower chamber and an upper chamber connected by a tube depending from the upper chamber to a point spaced above the bottom of the lower chamber, a high wattage heater and a low wattage heater for heating the lower chamber a circuit in which said heaters are located, switch means in said circuit, for manually closing the circuit to the high wattage heater and a thermostat, thermally remote from the high wattage heater and mounted upon a wall portion of the lower chamber below the lower end of said tube for operating the switch means, for breaking the circuit to the high wattage heater and closing the circuit to the low wattage heater in response to the temperature of said wall portion of the lower chamber, which portion is below the lower end of the tube and remains covered by water after the flow of water from the lower chamber to the upper chamber.

9. A vacuum coffee maker comprising a lower container having a reduced well at its lower end, an upper container having its lower portion received into the upper end of the lower container and having a depending tube extending into the lower container, and terminating above the top of said well, a high heat unit and a low heat unit associated with the lower container, an electric circuit in which said heat units are located, a switch located in the circuit, manual means for operating the switch to close the circuit to the high heat unit, and a bi-metal bar attached to said well for operating the switch for opening the circuit to the high heat unit and closing the circuit to the low heat unit when the temperature of the well rises to a predetermined point.

ALBERT C. WILCOX.

REFERENCES CITED

The following references are of record in the file of this patent:

UNITED STATES PATENTS

| Number | Name | Date |
|---|---|---|
| 2,005,764 | Wilcox | June 25, 1935 |
| 2,069,939 | Browning | Feb. 9, 1937 |
| 2,175,727 | Graham | Oct. 10, 1939 |
| 2,180,602 | Morgan | Nov. 21, 1939 |
| 2,181,090 | Lucia | Nov. 21, 1939 |
| 2,212,100 | Keaton | Aug. 20, 1940 |
| 2,224,378 | Coniglio | Dec. 10, 1940 |
| 2,287,580 | Wagner | June 23, 1942 |
| 2,287,583 | Weeks | June 23, 1942 |
| 2,365,615 | Woodman | Dec. 19, 1944 |
| 2,388,335 | McCullough | Nov. 6, 1945 |
| 2,424,161 | Gunther | July 15, 1947 |
| 2,427,444 | Colombo | Sept. 16, 1947 |
| 2,492,865 | Huenergardt | Dec. 27, 1949 |